United States Patent
Lu et al.

(10) Patent No.: US 11,870,269 B2
(45) Date of Patent: Jan. 9, 2024

(54) DYNAMIC CAPACITIVE POWER TRANSFER SYSTEM FOR A TRACKED VEHICLE

(71) Applicant: Drexel University, Philadelphia, PA (US)

(72) Inventors: Fei Lu, Wynnewood, PA (US); Hua Zhang, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 17/331,057

(22) Filed: May 26, 2021

(65) Prior Publication Data

US 2022/0029457 A1 Jan. 27, 2022

Related U.S. Application Data

(60) Provisional application No. 63/029,925, filed on May 26, 2020.

(51) Int. Cl.
  *H02J 50/05* (2016.01)
  *B66B 11/02* (2006.01)
  *B60L 9/00* (2019.01)
  *H02J 50/00* (2016.01)

(52) U.S. Cl.
  CPC .......... *H02J 50/05* (2016.02); *B60L 9/00* (2013.01); *B66B 11/0226* (2013.01); *H02J 50/005* (2020.01)

(58) Field of Classification Search
  CPC .......... H02J 50/05; H02J 50/005; B60L 9/00; B66B 11/0226
  See application file for complete search history.

(56) References Cited

U.S. PATENT DOCUMENTS

| 2015/0314984 A1 | 11/2015 | McCarthy et al. | |
| 2019/0036370 A1* | 1/2019 | Kanno | H02J 7/025 |
| 2020/0131002 A1* | 4/2020 | De Rai | B66B 7/064 |

FOREIGN PATENT DOCUMENTS

| DE | 102019201783 A1 * | 8/2020 | B66B 7/046 |
| EP | 3138800 A1 | 3/2017 | |

OTHER PUBLICATIONS

Lu et al., "A Dynamic Capacitive Power Transfer System with Reduced Power Pulsation" IEEE Xplore, 2016, 5 pages.

* cited by examiner

*Primary Examiner* — Daniel Cavallari
(74) *Attorney, Agent, or Firm* — Schott, P.C.

(57) ABSTRACT

A dynamic capacitive power transfer system for an elevator that can realize the real-time powering of the elevator when it is in the moving status. It includes a metal track along the building side as the power transmitter and a piece of metal at the elevator side as the power receiver. There is a gap between the transmitter and receiver, and up to kW power can be transferred wirelessly and efficiently to serve the air conditioner, lightning, and other electronic devices in the moving car. The steel wheels and ropes may be used to connect the moving car to the earth ground, which contributes to form the current returning loop. It eliminates the electric cables and the corresponding flexible cable carrier system for the linear movement.

9 Claims, 12 Drawing Sheets

TABLE I. HIGH-ORDER COMPENSATION NETWORKS

| | I. T-TYPE LCL | II. T-TYPE CLC | III. Π-TYPE LCL | IV. Π-TYPE CLC |
|---|---|---|---|---|
| HIGH-ORDER COMPENSATION | L L C | C C L | C L L | L C C |
| FREQUENCY | | $\omega = \dfrac{LC}{\sqrt{LC}}$ | | |

TABLE II. FEASIBLE CPT TOPOLOGIES

| TYPE | TOPOLOGY STRUCTURE | | NUMBER OF CIRCUITS | | INPUT-OUTPUT |
|---|---|---|---|---|---|
| BASIC CPT TOPOLOGY<br><br>PARALLEL-PARALLEL (PP) | SERIES-SERIES (SS) | 1 | | 4 | CV-CC |
| | SERIES-PARALLEL (SP) | 1 | | | CV-CV |
| | PARALLEL-SERIES (PS) | 1 | | | CV-CV |
| | PARALLEL-PARALLEL (PP)<br>(NOT RECOMMENDED) | 1 | | | CV-CC |
| HIGH-ORDER CPT TOPOLOGY (I) | T/⊓-SS | 4 | | 16 | CV-CV |
| | T/⊓-SP | 4 | | | CV-CC |
| | T/⊓-PS | 4 | | | CV-CC |
| | T/⊓-PP | 4 | | | CV-CV |
| HIGH-ORDER CPT TOPOLOGY (II)<br><br>(NOT RECOMMENDED) | SS-T/⊓ | 4 | | 16 | CV-CV |
| | SP-T/⊓ | 4 | | | CV-CC |
| | PS-T/⊓ | 4 | | | CV-CC |
| | PP-T/⊓ | 4 | | | CV-CV |
| HIGH-ORDER CPT TOPOLOGY (III) | T/⊓-SS-T/⊓ | 16 | | 64 | CV-CC |
| | T/⊓-SP-T/⊓ | 16 | | | CV-CV |
| | T/⊓-PS-T/⊓ | 16 | | | CV-CV |
| | T/⊓-PP-T/⊓ | 16 | | | CV-CC |

FIG. 19

TABLE III. SUMMARY OF THE FOUR CPT CIRCUITS

| CIRCUIT | I. SS TOPOLOGY | II. SP TOPOLOGY | III. PS TOPOLOGY | IV. LCL-PP-LCL TOPOLOGY |
|---|---|---|---|---|
| OUTPUT TYPE | CONSTANT-CURRENT (CC) | CONSTANT-VOLTAGE (CV) | CONSTANT-VOLTAGE (CV) | CONSTANT-CURRENT (CC) |
| RESONANCE | $\begin{cases}\omega^2 L_1\left(C_1+\frac{C_M C_2}{C_M+C_2}\right)=1 \\ \omega^2 L_2\left(C_2+\frac{C_M C_1}{C_M+C_1}\right)=1\end{cases}$ | $\begin{cases}\omega^2 L_1\left(C_1+C_M\right)=1 \\ \omega^2 L_2\left(C_2+\frac{C_M C_1}{C_M+C_1}\right)=1\end{cases}$ | $\begin{cases}\omega^2 L_1\left(C_1+\frac{C_M C_2}{C_M+C_2}\right)=1 \\ \omega^2 L_2\left(C_2+C_M\right)=1\end{cases}$ | $\begin{cases}\omega^2 L_{f1} C_{f1}=\omega^2 L_{f2} C_{f1}=1 \\ \omega^2 L_{f3} C_{f2}=\omega^2 L_{f4} C_{f2}=1 \\ \omega^2 L_1(C_1+C_M)=1 \\ \omega^2 L_1(C_2+C_M)=1\end{cases}$ |
| CURRENT/ VOLTAGE | $I_{out}=\frac{8V_{in}\cdot\omega(C_1+C_2+C_1C_2/C_M)}{\pi^2}$ | $V_{out}=\frac{8}{\pi^2}V_{in}\cdot\frac{C_1+C_M}{C_M}$ | $V_{out}=\frac{\pi^2}{8}V_{in}\cdot\frac{C_M}{C_2+C_M}$ | $I_{out}=\omega C_M\cdot\frac{C_{f1}\cdot C_{f2}}{C_M\cdot C_M}\cdot V_{in}$ |

FIG. 20

TABLE IV. SYSTEM SPECIFICATIONS AND CIRCUIT PARAMETER VALUES OF SS COMPENSATED CPT

| PARAMETER | DESIGN VALUE | PARAMETER | DESIGN VALUE |
|---|---|---|---|
| $V_{in}$ | 150 V | $f$ | 500 kHz |
| $L_1$ | 170 μH | $C_M$ | 300 pF |
| $w_1$ | 5 nF | $C_2$ | 500 pF |
| $h_1$ | 18 μH | $L_2$ | 123 μH |
| $f_{sw}$ | 1 MHz | $C_M$ | 140 pF |
| $L_1$ ($L_2$) | 45.5 μH | $C_1$ ($C_2$) | 450 pF |

FIG. 21

TABLE V. SYSTEM SPECIFICATIONS OF SP COMPENSATED CPT

| PARAMETER | DESIGN VALUE | PARAMETER | DESIGN VALUE |
|---|---|---|---|
| $V_{in}$ | 60 V | $f$ | 1 MHz |
| $L_F$ | 170 μH | $C_M$ | 300 pF |
| $C_1$ | 300 pF | $C_2$ | 5.5 nF |
| $L_1$ | 42 μH | $L_2$ | 4.2 μH |
| $S_1, S_2, S_3$ AND $S_4$ | C3m0065090D | $D_1, D_2, D_3$ AND $D_4$ | C4D30120D |

FIG. 22

TABLE VI. SYSTEM SPECIFICATIONS OF PS COMPENSATED CPT

| PARAMETER | DESIGN VALUE | PARAMETER | DESIGN VALUE |
|---|---|---|---|
| $V_{in}$ | 150 V | $f$ | 500 kHz |
| $L_{dc}$ | 170 μH | $C_M$ | 300 pF |
| $C_1$ | 5 nF | $C_2$ | 500 pF |
| $L_1$ | 18 μH | $L_2$ | 123 μH |
| $S_1, S_2, S_3$ AND $S_4$ | C3M0120090D | $D_1, D_2, D_3$ AND $D_4$ | C6D20065D |

DYNAMIC CAPACITATIVE POWER TRANSFER SYSTEM FOR A TRACKED VEHICLE

BACKGROUND

Wireless power transfer technology is convenient to provide power to equipment without direct metal-to-metal contact. There are usually two methods to deliver this power: inductive power transfer (IPT) and capacitive power transfer (CPT). The IPT system generates high-frequency magnetic fields to transfer power and has been widely used in the charging of the low-power and high-power applications. The CPT system uses the high-frequency electric fields to transfer power, and it does not have the eddy-current loss in the metal materials, which is an important advantage. In addition, the circulating current in a CPT system is smaller, and the system has the capability to achieve much higher efficiency.

Also, during the past few years, the CPT system has been well developed. The system power level has been increased to reach kW and the efficiency can achieve 92%. Meanwhile, the transfer distance has been extended to hundreds of mm for the long-distance scenario. It can be applied to the charging of the high-power electric vehicles with high efficiency. Therefore, considering the recent development of the CPT technology, it is meaningful to apply it into more applications.

The powering of a transport vehicle like an elevator is one potential application. For the elevator, there are multiple loads in the moving car, such as the air conditioner, light, communication devices, and door-control motor. The total power consumption is usually in the kW range. In order to provide sufficient power to the moving cart, there are some cables connected with the car with a flexible cable carrier. However, these mechanical structure increases the system complexity. Due to its maintenance requirement, the system total cost is increased and the reliability is reduced. Previously, the inductive method is proposed to achieve the stationary charging of the moving car when it stops at a certain floor. However, the effective charging time is very short when it stops, and the car needs to carry extra battery to support the power in the moving status, which also increases the system cost and complexity.

SUMMARY OF THE EMBODIMENTS

A dynamic capacitive power transfer system provides continuous power to a car when it is in a moving state. Compared to a conventional elevator system, the proposed system increases system reliability by eliminating the cables and corresponding mechanical structures. At the same time, compared to the inductive power transfer system, this system does not need to carry batteries, which in combination with other features, saves money.

BRIEF DESCRIPTION OF THE DRAWINGS

FIG. 19 shows Table II.
FIG. 20 shows Table III.
FIG. 21 shows Table IV.
FIG. 22 shows Table V.
FIG. 23 shows Table VI.

DETAILED DESCRIPTION OF THE EMBODIMENTS

1. Technique Approach
1.1 Proposed System Structure

Figure 1A:
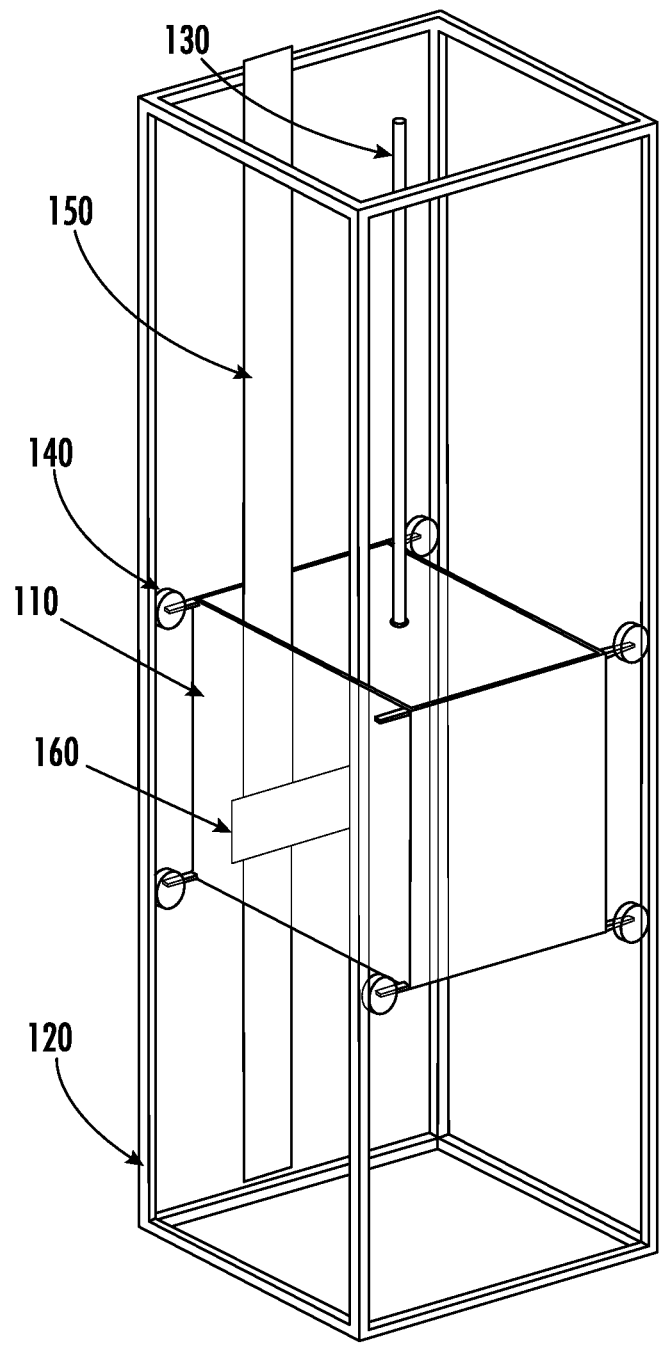
FIGS. 1(a)-1(c) show illustrations of different views of a structure of a dynamic capacitive power transfer system for a moving transport like an elevator.
Figure 1B:
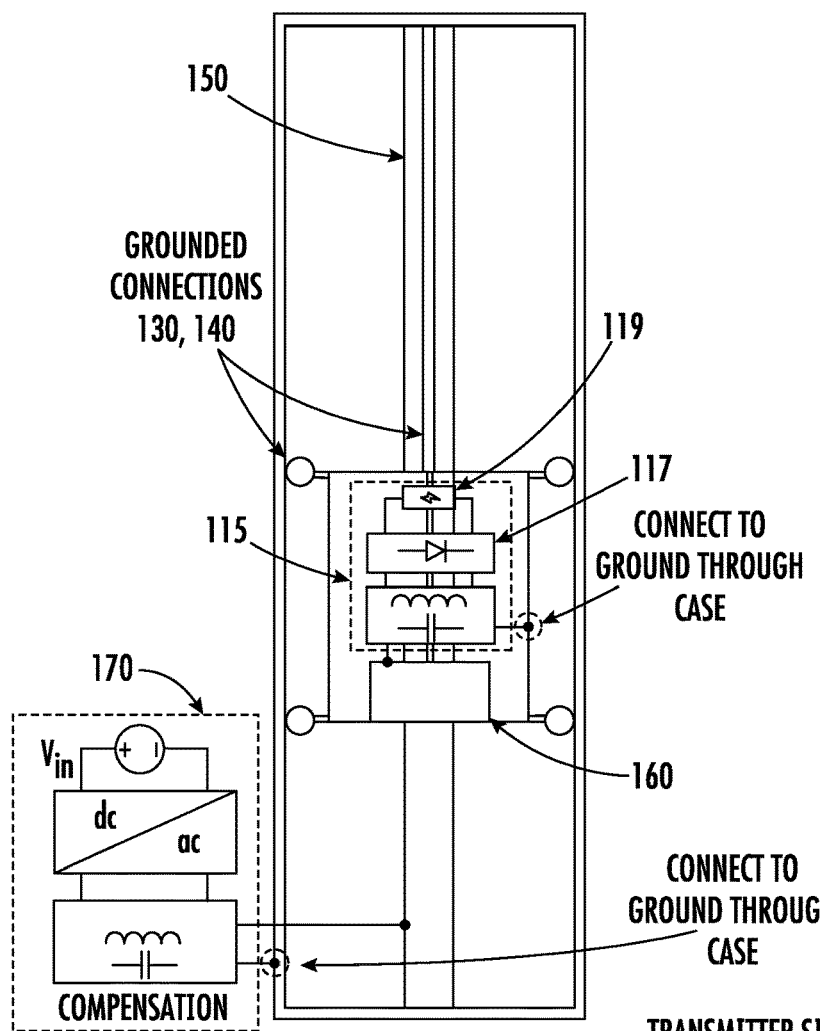
Figure 1C:
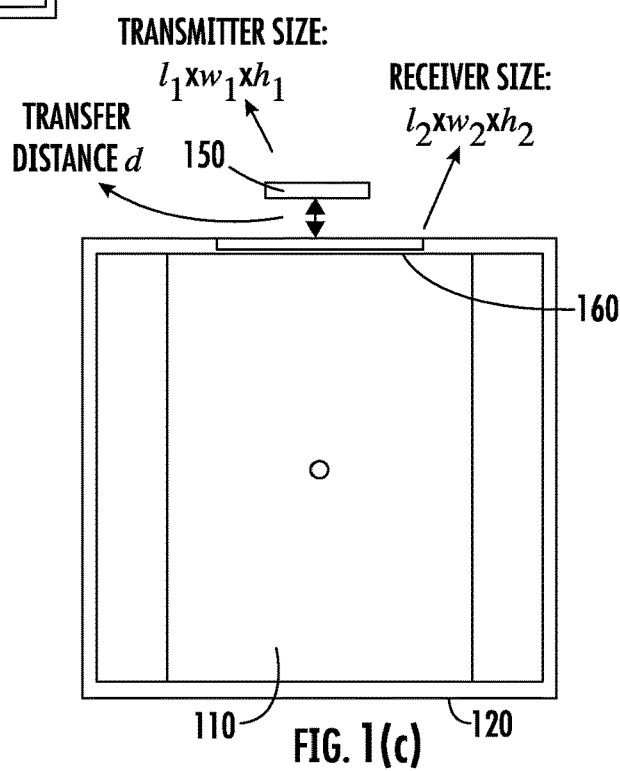

The proposed dynamic capacitive power transfer system for a transport vehicle like elevator is shown in FIGS. 1(a)-1(c). The 3D view, front view, and top view are provided to show all the details of the structure.

The car 110 can move up and down along the outside frame 120 that is connected to ground. There may be two connections between the car 110 and the frame 120. First, the hoist cables 130 on the top of the car 110 are usually made from a conductor and may be connected to the frame 120. Second, the rolling wheels 140 around the car 110 may also be also made from a conductor and have direct contact with the frame 120. Since the frame 120 is connected to ground, the car 110 is then connected to the earth ground. A conductive track 150 may be used as the power transmitter from a voltage source. In the practical application, the length of the conductive track 150 may depend on installation requirements. The length of the conductive track 150 may be in the range of tens of meters in an elevator shaft. The car 110 may include a piece of conductive plating 160 attached on the back of the car 110 as a receiver. Since the distance between the transmitter (track 150) and receiver (plating 160) is relatively small, the size of receiver does not need to be large, which can reduce the cost of the car side installation. When the car 110 moves along the track 150, the receiver can acquire power from the transmitter continuously and then send it to the loads.

As best seen in FIG. 1(b), a power electronics converter 170 is used at the ground side, which is connected to the conductive track 150 and the frame 120. A dc source Vin is used as the power supply connected to a dc/ac inverter to generate high-frequency ac excitation to the circuit. Then, the compensation circuit 115, including inductors and capacitors, is used to form resonance in the circuit to increase the voltage and current for sufficient power transfer. In the moving car 110, a power electronic circuit is also used to convert the power and supply to the load 119. Similarly, the compensation circuit 115 is adopted to form the resonance, and a rectifier 117 is used to generate dc current for the load. One terminal of the resonant circuit is connected to the receiver plate 160, and the other terminal is connected to the moving car 110. In this way, the primary and secondary sides share a same connection, which is the earth ground. In this way, this system is not a typical wireless power transfer system and we can call it a quasi-wireless power transfer system with shared ground connected.

The top view of FIG. 1(c) shows the definitions of the sizes of the transmitting and receiving plates. In a real application, the transmitter track may be designed to be narrow to reduce the impact and field emissions to the nearby environment. The receiver plate can be designed wide to ensure a good coupling with the transmitter. There is an airgap distance between the transmitter and receiver, which is typically in the range of tens of mm for the elevator.

1.2 Circuit Design of the Dynamic Capacitive Power Transfer

Figure 2:
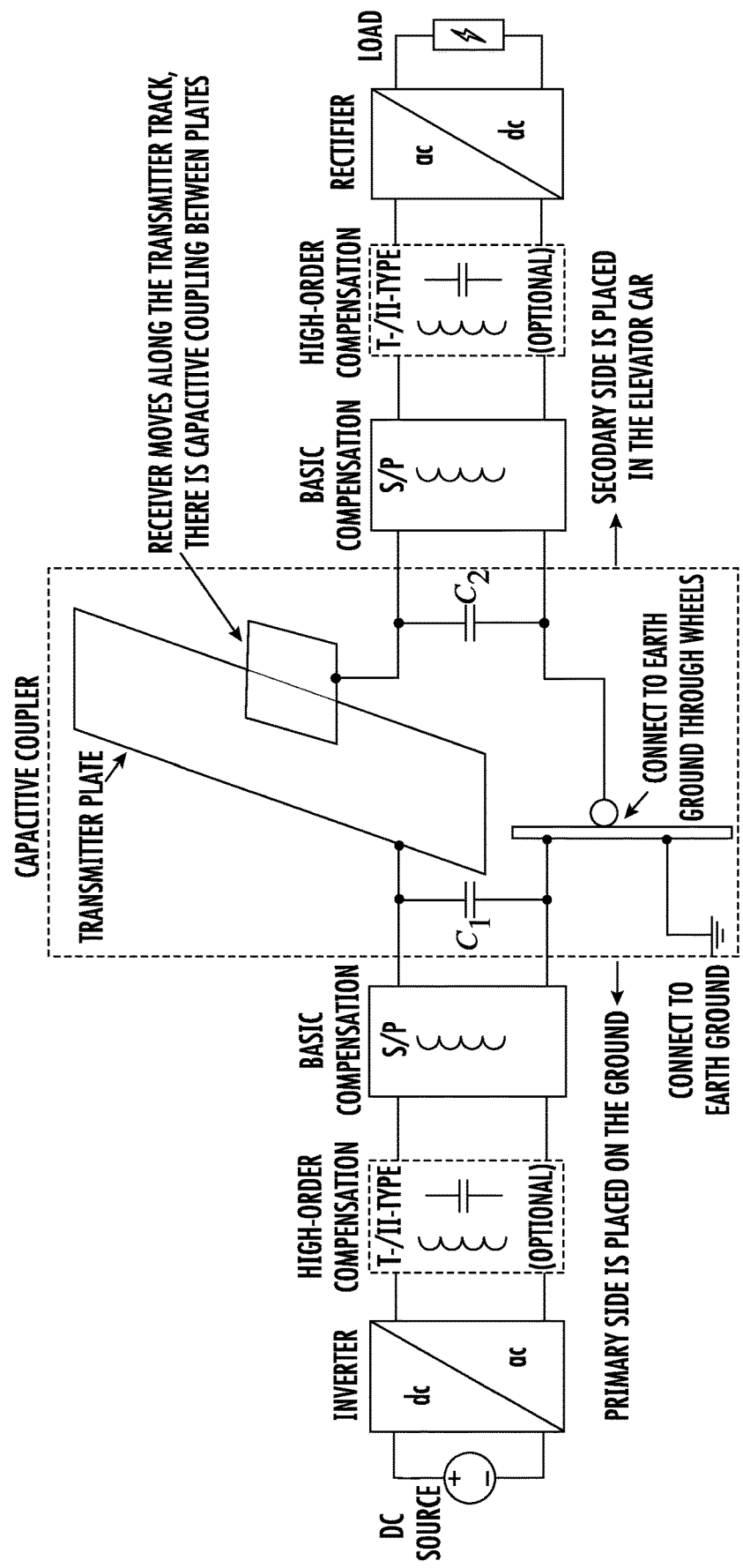
FIG. 2 shows a circuit model of the dynamic capacitive power transfer system for a moving transport like an elevator.

According to system structure, the circuit model of the dynamic capacitive power transfer system is shown in FIG. 2. For the capacitive coupler, the transmitter plate has coupling with the receiver plate. Considering the large size of the transmitter, the receiver can move along the transmitter to ensure continuous coupling. The coupling between plates can provide the forward path of the current and power flow, which could be equivalent to a capacitor CM. Also, the other terminal of the coupler is connected together with the earth ground, which works as the returning path of the current. When the receiver moves, the connection is always maintained by the wheels and ropes as mentioned above.

Capacitors C1 and C2 are used to increase self-capacitance, which could be viewed as part of the capacitive coupler. In order to use the coupling capacitance to transfer power, the compensation circuits are required at both the input and output sides, which includes two parts: basic compensation and high-order compensation, shown in FIG. 2.

The basic compensation is made up of a single inductor, which could be series (S) or parallel (P) connected to the double sides of the coupler. Therefore, there are 4 basic compensations, namely, series-series (SS), series-parallel (SP), parallel-series (PS), and parallel-parallel (PP). The high-order compensation includes T-type or Π-type LCL/CLC networks, which are provided in FIG. 18, Table. I. The basic compensation is necessary to cancel the reactive power generated by the capacitive coupler while the high-order compensation is optional, which may be used to enhance the system power level.

FIG. 2 demonstrates a general CPT circuit structure. By using different compensations, feasible CPT topologies could be developed, shown in FIG. 19, Table. II. With the constant-voltage (CV) input source, the output property, constant-voltage (CV) or constant-current (CC), is provided. It should be noticed that the parallel-parallel (PP) CPT topology has a poorer capability to achieve effective power transfer, and therefore, is not recommended. Besides, the class of "high-order CPT topology (II)" uses a single inductor in the transmitting side but complicated high-order compensation in receiving side, which may be disadvantageous.

1.3 Working Principle Analysis

Excluding the CPT circuits that are not recommended, there are still 83 feasible candidates. Four typical CPT circuit examples are analyzed to show the working principle, with these being at present the examples more likely to be used.

1.3.1 Series-Series (SS) Compensated Circuit Topology

Figure 3:
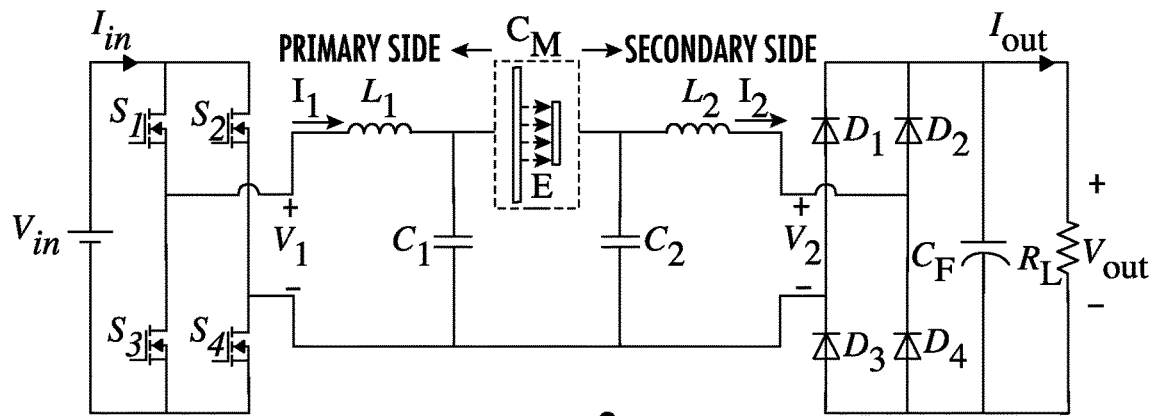
FIG. 3 shows a circuit topology with series-series inductor compensation for the dynamic CPT system.

The SS compensated CPT is shown in FIG. 3, the coupling between the plates is represented by an equivalent capacitance CM, and the value of CM relates to the circuit performance. The compensation inductors L1 and L2 are series-connected to the coupler. A voltage-fed full-bridge inverter with four MOSFETs (S1-S4) is used at the input side to provide the ac excitation. A voltage-fed full-bridge rectifier with four diodes (D1-D4) is used at the output side to serve dc power to the load RL. Capacitor CF is used to filter the output voltage ripple.

In FIG. 3, the circuit resonance is expressed as $$\begin{cases} \omega^2 \cdot L_1 \cdot \left(C_1 + \dfrac{C_M C_2}{C_M + C_2}\right) = 1 \\ \omega^2 \cdot L_2 \cdot \left(C_2 + \dfrac{C_M C_1}{C_M + C_1}\right) = 1 \end{cases} \quad (1)$$

The output current $I_{out}$ is independent of the load condition, expressed as $$I_{out} = \dfrac{8}{\pi^2} V_{in} \cdot \omega (C_1 + C_2 + C_1 C_2 / C_M) \quad (2)$$

The system power is expressed as $$P_{out} = \dfrac{8}{\pi^2} V_{in} V_{out} \cdot \omega (C_1 + C_2 + C_1 C_2 / C_M) \quad (3)$$

1.3.2 Series-Parallel (SP) Compensated Circuit Topology

Figure 4:
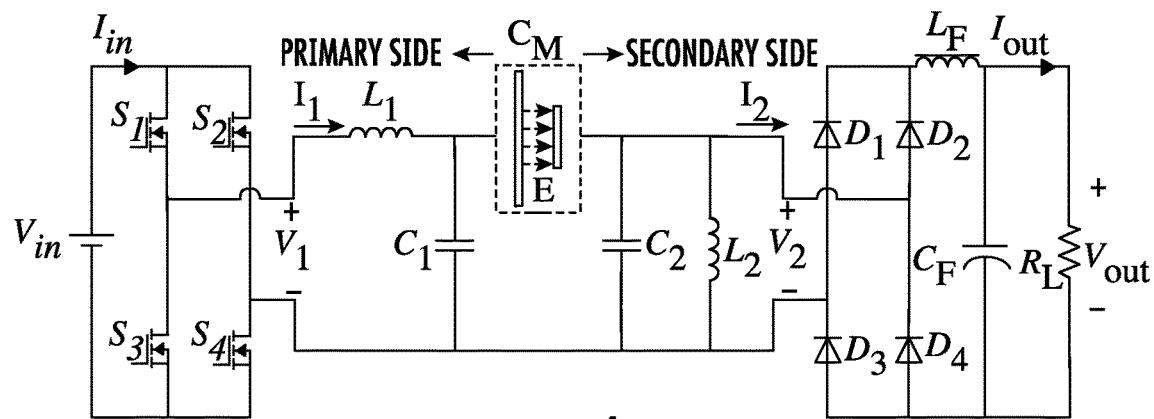
FIG. 4 shows a circuit topology with series-parallel inductor compensation for the dynamic CPT system.

The SP compensated CPT is shown in FIG. 4. The compensation inductors L1 and L2 are respectively series (S) and parallel (P) connected to the coupler. A voltage-fed full-bridge inverter is used at the input side and a current-fed full-bridge rectifier is used at the output side. DC filter inductor LF is directly connected to the rectifier to reduce the current ripple. Capacitor CF is used to filter the output voltage ripple.

In FIG. 4, the circuit resonance is expressed as $$\begin{cases} \omega^2 \cdot L_1 \cdot (C_1 + C_M) = 1 \\ \omega^2 \cdot L_2 \cdot \left(C_2 + \dfrac{C_M C_1}{C_M + C_1}\right) = 1 \end{cases} \quad (4)$$

The output voltage $V_{out}$ is independent of the load condition, expressed as $$V_{out} = \dfrac{8}{\pi^2} V_{in} \cdot \dfrac{C_1 + C_M}{C_M} \quad (5)$$

The system power is expressed as $$P_{out} = \frac{8}{\pi^2} V_{in} I_{out} \cdot \frac{C_1 + C_M}{C_M} \quad (6)$$

1.3.3 Parallel-Series (PS) Compensated Circuit Topology

Figure 5:
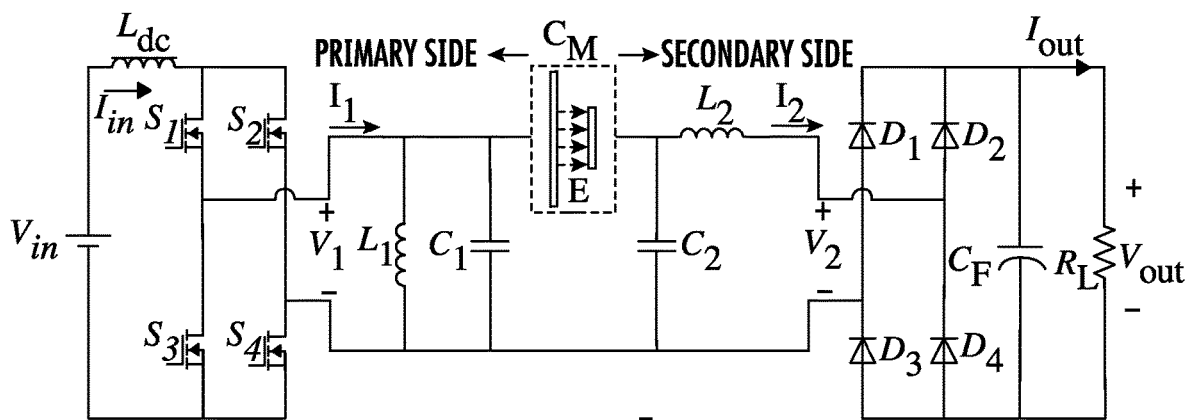
FIG. 5 shows a circuit topology with parallel-series inductor compensation for the dynamic CPT system.

The PS compensated CPT is shown in FIG. 5. The compensation inductors L1 and L2 are respectively parallel (P) and series (S) connected to the coupler. A current-fed inverter is used at the input side and a voltage-fed rectifier is used at the output side. DC filter inductor Ldc is connected at the input dc side to generate a square-wave current II Capacitor CF is used to filter the output voltage ripple.

In FIG. 5 the circuit resonance is expressed as $$\begin{cases} \omega^2 \cdot L_1 \cdot \left(C_1 + \frac{C_M C_2}{C_M + C_2}\right) = 1 \\ \omega^2 \cdot L_2 \cdot (C_2 + C_M) = 1 \end{cases} \quad (7)$$

The output voltage $V_{out}$ is also independent of the load condition, expressed as $$V_{out} = \frac{8}{\pi^2} V_{in} \cdot \frac{C_M}{C_2 + C_M} \quad (8)$$

The system power is expressed as $$P_{out} = \frac{8}{\pi^2} V_{in} I_{out} \cdot \frac{C_M}{C_2 + C_M} \quad (9)$$

1.3.4 LCL-PP-LCL Compensated Circuit Topology

Figure 6:
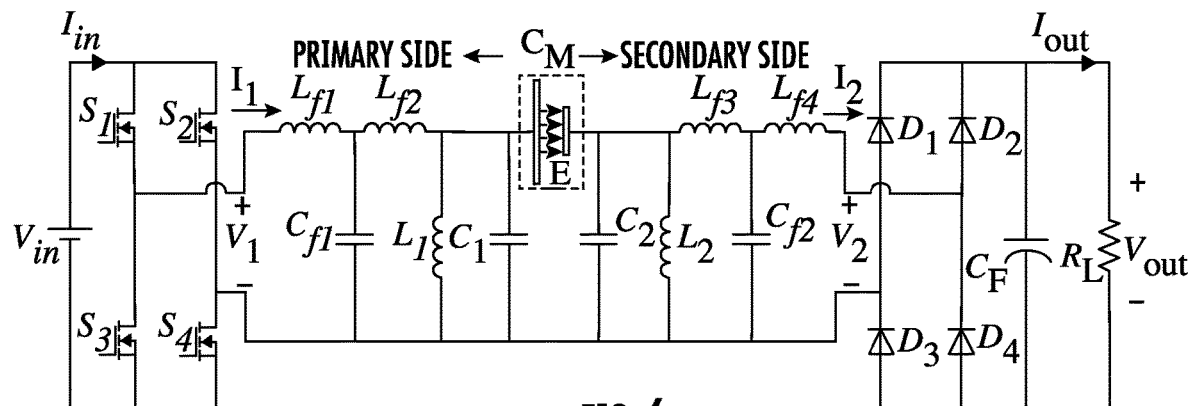
FIG. 6 shows a circuit topology with LCL-PP-LCL compensation for the dynamic CPT system.

The double-sided LCL-PP-LCL compensated CPT circuit is shown in FIG. 6. The compensation inductors L1 and L2 are parallel-connected to the coupler. Two sets of T-type networks (Lf1, Lf2 and Cf1; Lf3, Lf4 and Cf2) are respectively used in the primary and secondary sides.

In FIG. 6, the circuit resonance is expressed as $$\begin{cases} \omega^2 \cdot L_{f1} C_{f1} = \omega^2 \cdot L_{f2} C_{f1} = 1 \\ \omega^2 \cdot L_{f3} C_{f2} = \omega^2 \cdot L_{f4} C_{f2} = 1 \\ \omega^2 \cdot L_1 \cdot (C_1 + C_M) = 1 \\ \omega^2 \cdot L_2 \cdot (C_2 + C_M) = 1 \end{cases} \quad (10)$$

The output current $I_{out}$ is independent of the load condition, expressed as $$I_{out} = \omega C_M \cdot \frac{C_{f1} \cdot C_{f2}}{C_M \cdot C_M} \cdot V_{in} \quad (11)$$

The system power is expressed as $$P_{out} = \omega C_M \cdot \frac{C_{f1} \cdot C_{f2}}{C_M \cdot C_M} \cdot V_{in} V_{out} \quad (12)$$

These four CPT circuits are summarized in FIG. 20, Table III. The SS and LCL-PP-LCL CPT circuits can achieve constant-current (CC) outputs, which means that the load current is independent of load condition and keeps constant when the load varies. The SP and PS circuits can achieve constant-voltage (CV) output, which keeps constant despite the load variation.

Figure 7:
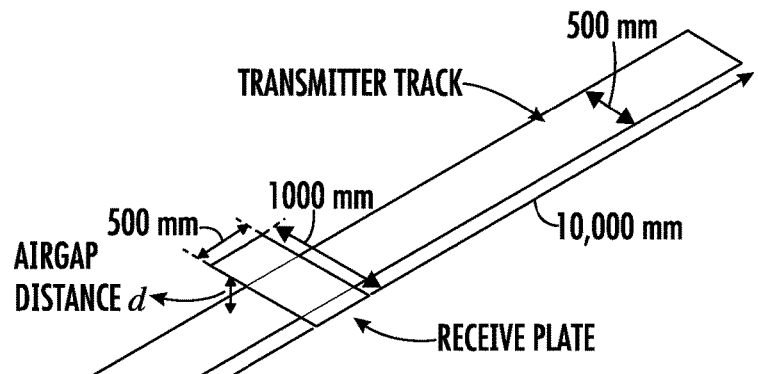
FIG. 7 shows an example of the capacitive coupler for the dynamic CPT system.
Figure 8:
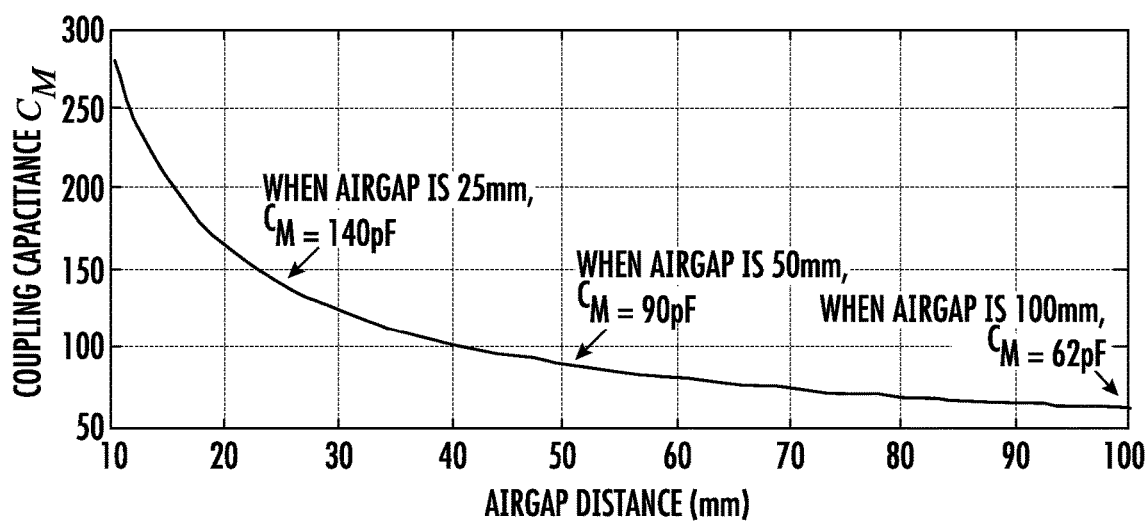
FIG. 8 shows a finite element analysis of the capacitance when the airgap varies.
Figure 9:
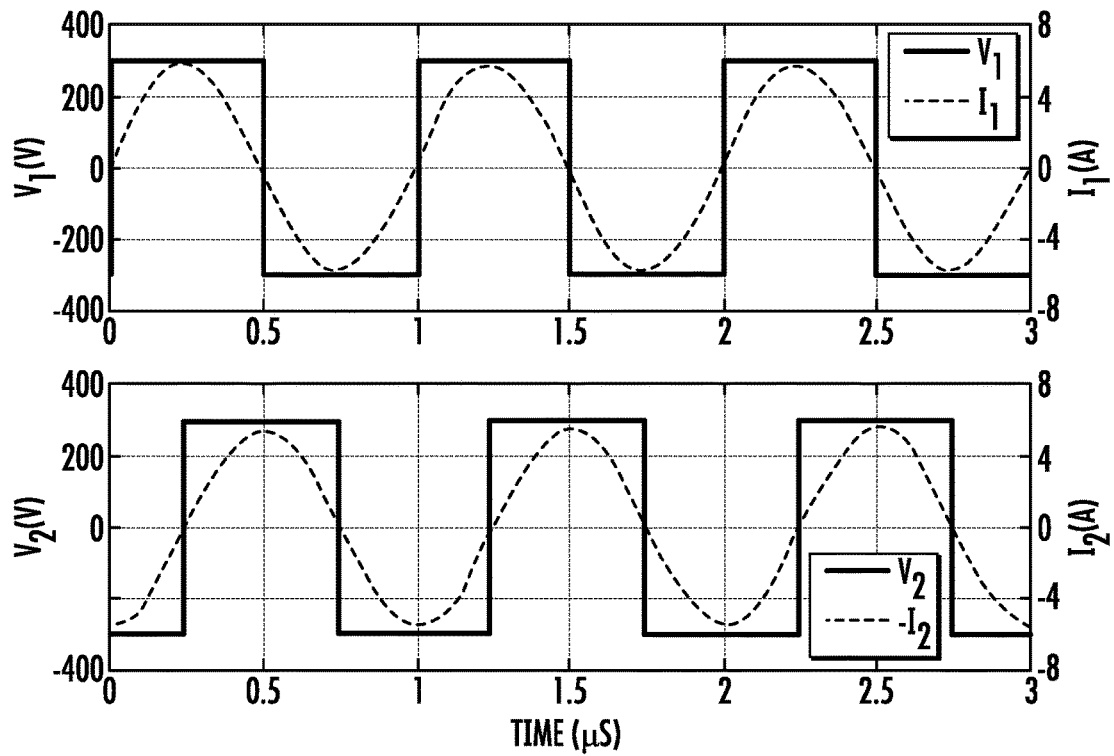
FIG. 9 shows the LTspice simulated waveforms.

2. A 1.0 kW Design Example of SS Compensated CPT System for Elevator 2.1 Plate Dimensions Design A 1.0 kW example of the dynamic CPT system is designed based on the SS compensated circuit topology to validate the proposed idea. The dimension of the capacitive coupler is shown in FIG. 7, FIG. 8 shows a finite element analysis of the capacitance when the airgap varies, and FIG. 9 shows the LTspice simulated waveforms.

Figure 12:
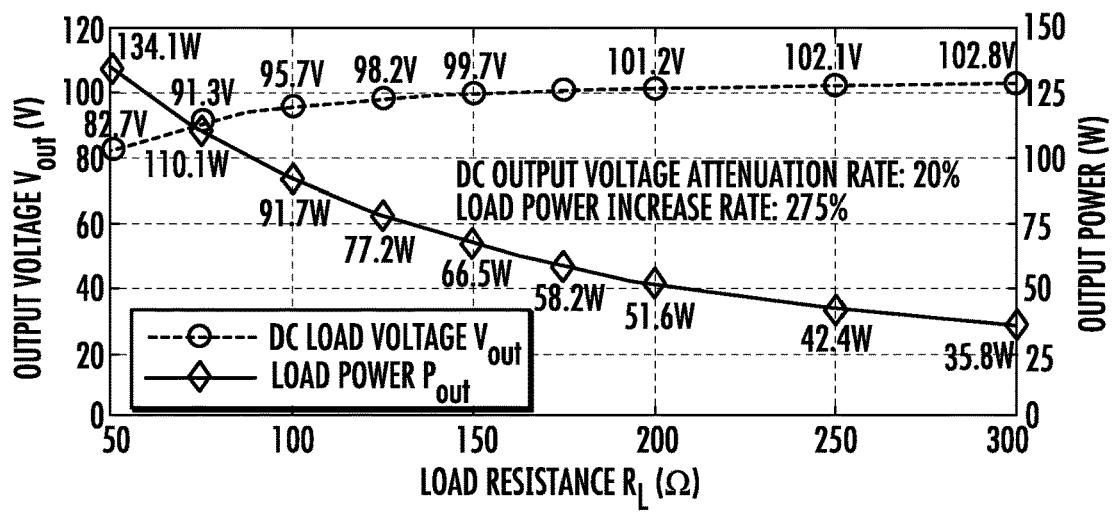
FIG. 12 shows output voltage and power vs. different load resistance RL.

At different load conditions, the measured dc output voltage Vout and the load power Pout are provided in FIG. 12. When the load resistance RL reduces from 300Ω to 50Ω, the load power PL increases from 35.8 W to 134.1 W, experiencing a significant increase rate of 275%. However, the dc output voltage shows a good constancy, which reduces from 102.8V to 82.7V with a dc voltage attenuation rate of 20%, validating the proposed CV output property.

Figure 13:
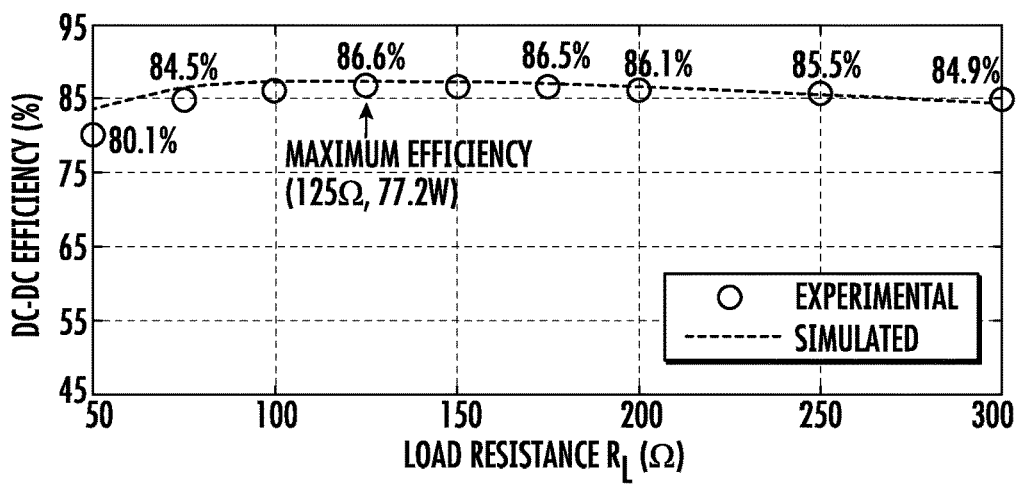
FIG. 13 shows experimental efficiency at different load conditions.

At different load conditions, the system dc-dc efficiency is provided in FIG. 13. With a large load variation from 50Ω to 300Ω, the efficiency maintains above 80%. The maximum efficiency reaches 86.6% at a load resistance of 125Ω and 77.2 W power. At the highest power of 134.1 W, the efficiency can achieve 80.1%.

Figure 10:
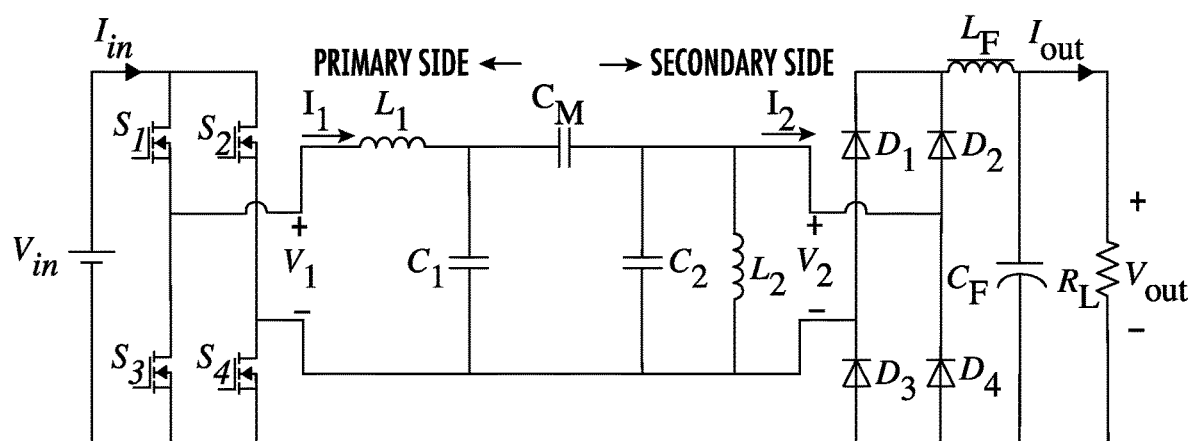
FIG. 10 shows Series-Parallel compensated CPT circuit topology.
Figure 11:
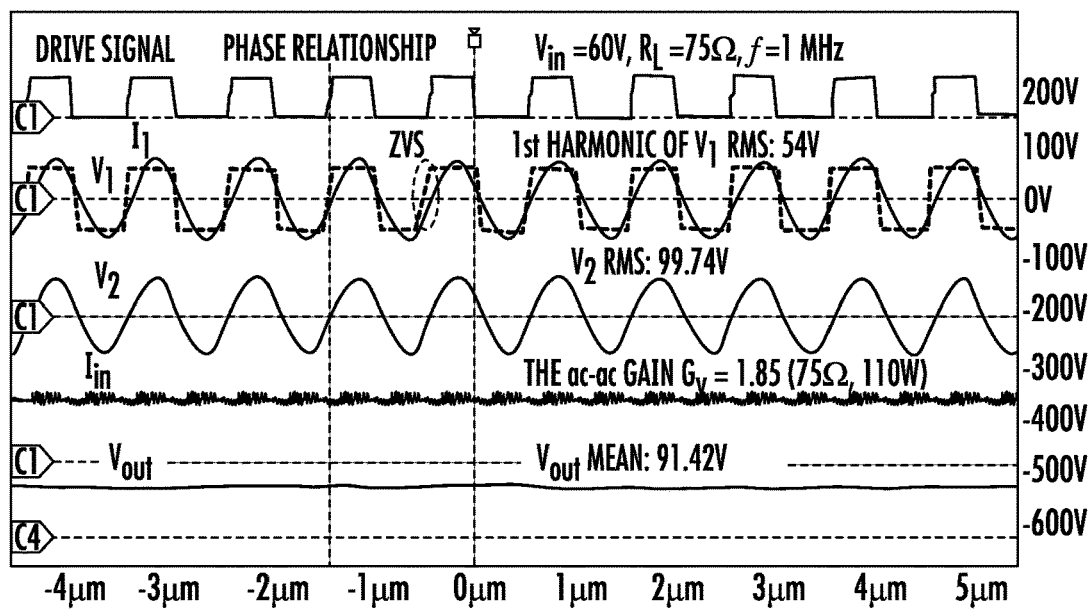
FIG. 11 shows experimental waveforms of the SP compensated CPT.

3. Experimental Validation of Parallel-Series Compensated CPT System 3.1 Parameter Design SP Compensated CPT The equivalent Series-Parallel (SP) compensated CPT circuit is provided in FIG. 10, and the circuit parameters of the SP compensated CPT topology are shown in FIG. 22, 3.2 Experimental Results Using the parameters in FIG. 22, Table V, the experimental system waveforms of the SP compensated CPT system are shown in FIG. 11.

At different load conditions, the measured dc output voltage Vout and the load power Pout are provided in FIG. 12. When the load resistance RL reduces from 300Ω to 50Ω, the load power PL increases from 35.8 W to 134.1 W, experiencing a significant increase rate of 275%. However, the dc output voltage shows a good constancy, which reduces from 102.8V to 82.7V with a dc voltage attenuation rate of 20%, validating the proposed CV output property.

At different load conditions, the system dc-dc efficiency is provided in FIG. 13. With a large load variation from 50Ω to 300Ω, the efficiency maintains above 80%. The maximum efficiency reaches 86.6% at a load resistance of 125Ω and 77.2 W power. At the highest power of 134.1 W, the efficiency can achieve 80.1%.

4. Experimental Validation of Series-Parallel Compensated CPT System 4.1 Parameter Design SP Compensated CPT The equivalent Series-Parallel (SP) compensated CPT circuit is provided in FIG. 10, and the circuit parameters of the SP compensated CPT topology are shown in FIG. 22, Table V.

4.2 Experimental Results

Using the parameters in FIG. 22, Table V, the experimental system waveforms of the SP compensated CPT system are shown in FIG. 11.

At different load conditions, the measured dc output voltage Vout and the load power Pout are provided in FIG.

12. When the load resistance RL reduces from 300Ω to 50Ω, the load power PL increases from 35.8 W to 134.1 W, experiencing a significant increase rate of 275%. However, the dc output voltage shows a good constancy, which reduces from 102.8V to 82.7V with a dc voltage attenuation rate of 20%, validating the proposed CV output property.

At different load conditions, the system dc-dc efficiency is provided in FIG. 13. With a large load variation from 50Ω to 300Ω the efficiency maintains above 80%. The maximum efficiency reaches 86.6% at a load resistance of 125Ω and 77.2 W power. At the highest power of 134.1 W, the efficiency can achieve 80.1%.

Figure 14:
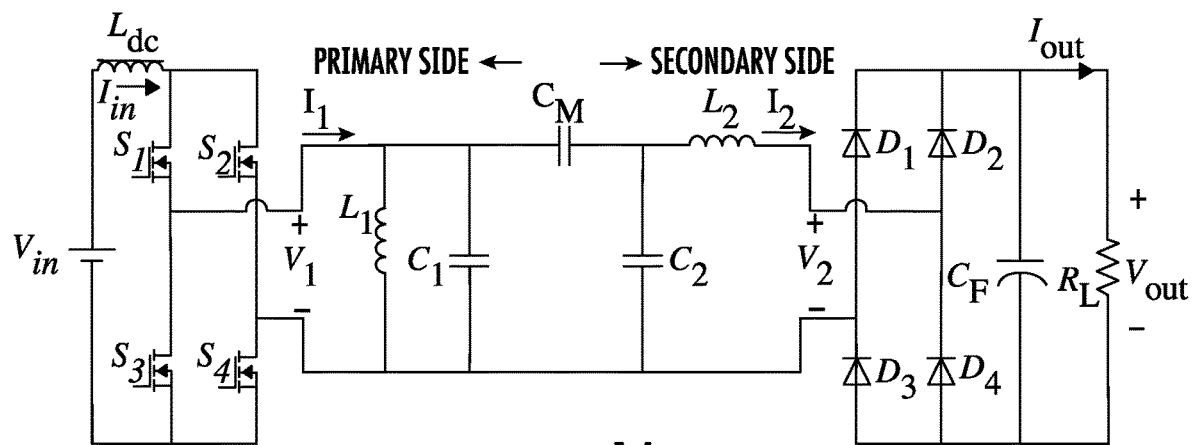
FIG. 14 shows Parallel-Series compensated CPT circuit topology.

5. Experimental Validation of Parallel-Series Compensated CPT System 5.1 Parameter Design PS Compensated CPT The equivalent Parallel-Series (PS) compensated CPT circuit is provided in FIG. 14, and the circuit parameters of the PS compensated CPT topology are shown in FIG. 23, Table VI.

5.2 Experimental Result

Figure 15:
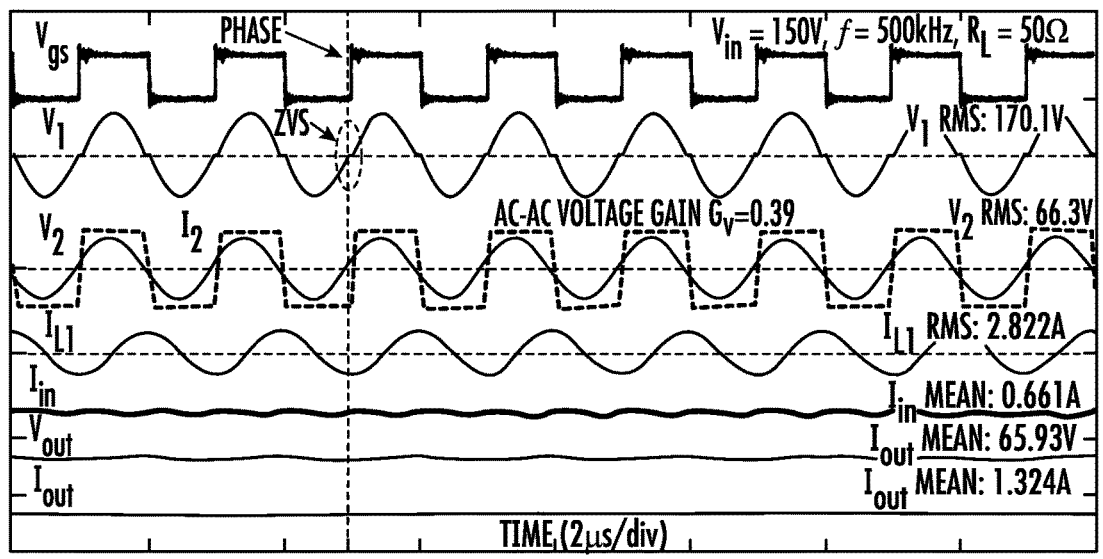
FIG. 15 shows experimental waveforms of the PS compensated CPT.

Using the parameters in FIG. 23, Table VI, the experimental system waveforms of the PS compensated CPT system are shown in FIG. 15.

Figure 16:
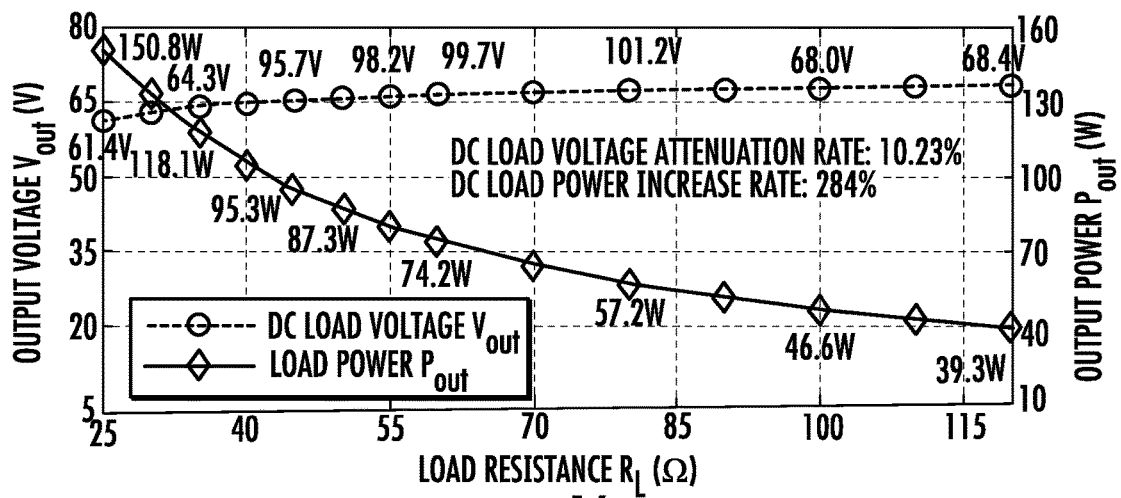
FIG. 16 shows output voltage and power vs. different load resistance RL.

When RL varies from 25Ω~120Ω, the measured output voltage Vout and power Pout are provided in FIG. 16. When RL reduces from 120Ω to 25Ω, the load power Pout has a significant increase by 284% from 39.3 W to 150.8 W. The output voltage is robust and only drops slightly from 68.4V to 61.4V with an attenuation rate of 10.23%. It validates the load-independent CV output property.

Figures 17, 18:
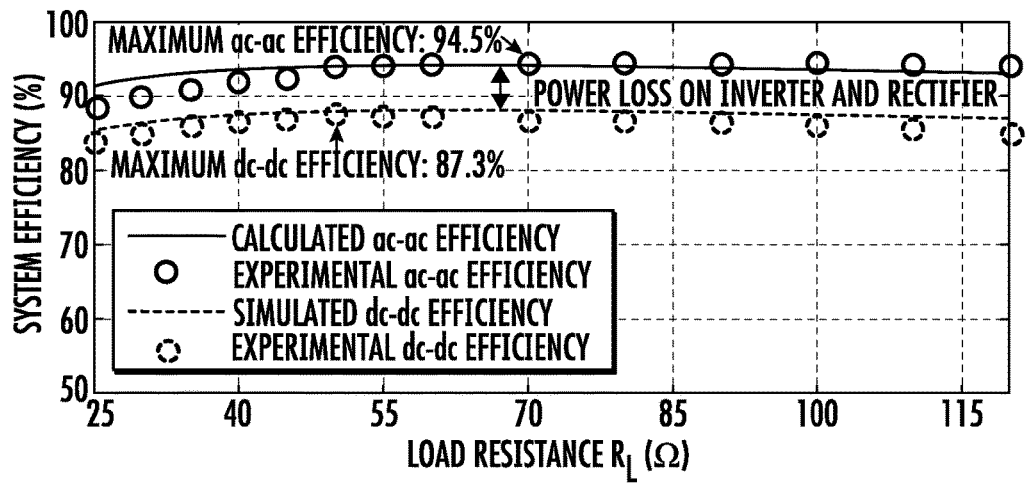
FIG. 17 shows experimental efficiency at different load conditions.
FIG. 18 shows Table I.

The measured ac-ac and dc-dc efficiencies are in FIG. 17. With a wide load range (25Ω~120Ω), the dc-dc efficiency maintains above 83%. The maximum dc-dc efficiency can achieve 87.3% at a load resistance of 50Ω and 87.3 W output power, and the maximum ac-ac efficiency can achieve 94.5%. The power loss on the inverter and rectifier determines the difference between ac-ac and dc-dc efficiencies. The calculated and simulated results are also provided, showing consistency with experiments.

Although the focus in this disclosure has been on an elevator, it should be understood that the technology described herein could be used with other tracked vehicles.

While the invention has been described with reference to the embodiments above, a person of ordinary skill in the art would understand that various changes or modifications may be made thereto without departing from the scope of the claims.

The invention claimed is:

1. A capacitive power transfer system for a vehicle, comprising:
   a vehicle connected to ground, wherein the vehicle comprises a power receiver plate;
   a frame connected to ground, wherein the vehicle is connected to ground through the frame; and
   a power transmitter plate separated from the power receiver plate, wherein power is continuously transferred from the power transmitter plate to the power receiver plate to power the vehicle while the vehicle moves along a length of the power transmitter plate, and wherein the power receiver plate moves along the power transmitter plate during a movement of the vehicle.

2. The capacitive power transfer system of claim 1, wherein the power transmitter plate and the power receiver plate are not in physical contact with one another.

3. The capacitive power transfer system of claim 1, wherein the power transmitter plate and the power receiver plate form a primary side and a secondary side of a circuit topology of a double sided LC.

4. The capacitive power transfer system of claim 1, wherein the vehicle includes the power receiver plate, and wherein the power transmitter plate is a track that follows a path of the vehicle.

5. The capacitive power transfer system of claim 1, wherein the vehicle is an elevator car, and wherein the elevator car is connected to the ground through at least one of cables and wheels.

6. The capacitive power transfer system of claim 5, wherein the elevator car comprises the cables and the wheels, wherein the wheels and the cables are made from a conductor, and wherein the cables are arranged on top of the elevator car.

7. The capacitive power transfer system of claim 1, wherein the length of the power transmitter plate corresponds to a length of the frame.

8. The capacitive power transfer system of claim 1, wherein the vehicle comprises cables arranged on top of the vehicle and connected to the frame.

9. The capacitive power transfer system of claim 1, wherein the vehicle comprises wheels arranged around corners of the vehicle, and wherein the wheels are in direct contact with the frame.

\* \* \* \* \*